(12) United States Patent
Tiun et al.

(10) Patent No.: US 8,953,098 B2
(45) Date of Patent: Feb. 10, 2015

(54) TELEVISION SIGNAL PROCESSING DEVICE AND TELEVISION SIGNAL PROCESSING METHOD

(75) Inventors: Seng-Chong Tiun, Changhua County (TW); Ming-Luen Liou, Taipei (TW); Tsung-Han Wu, Yun-Lin Hsien (TW); Yu Ding, Guangzhou (CN)

(73) Assignee: Mediatek Inc., Hsin-Chu (TW)

(*) Notice: Subject to any disclaimer, the term of this patent is extended or adjusted under 35 U.S.C. 154(b) by 0 days.

(21) Appl. No.: 13/575,609

(22) PCT Filed: Jan. 29, 2010

(86) PCT No.: PCT/CN2010/070424
§ 371 (c)(1),
(2), (4) Date: Aug. 22, 2012

(87) PCT Pub. No.: WO2011/091602
PCT Pub. Date: Aug. 4, 2011

(65) Prior Publication Data
US 2013/0135533 A1   May 30, 2013

(51) Int. Cl.
*H04N 5/44* (2011.01)
*H04N 5/455* (2006.01)
*H04N 5/53* (2006.01)

(52) U.S. Cl.
CPC . *H04N 5/455* (2013.01); *H04N 5/53* (2013.01)
USPC ........... 348/571; 348/725; 348/726; 348/729; 348/731

(58) Field of Classification Search
USPC .................. 348/725, 726, 729, 731, 678, 571
See application file for complete search history.

(56) References Cited

U.S. PATENT DOCUMENTS

| 5,887,243 A | 3/1999 | Harvey | |
|---|---|---|---|
| 8,212,941 B2* | 7/2012 | Liou et al. | 348/726 |
| 2008/0049871 A1* | 2/2008 | Yang et al. | 375/316 |

FOREIGN PATENT DOCUMENTS

| TW | 174965 | 12/1991 |
|---|---|---|
| TW | 200835334 | 8/2008 |

* cited by examiner

*Primary Examiner* — Jefferey Harold
*Assistant Examiner* — Jean W Desir
(74) *Attorney, Agent, or Firm* — Winston Hsu; Scott Margo (57) ABSTRACT

A television signal processing device and a television signal processing method are proposed according to embodiments of the present invention, wherein the television signal processing device includes a first signal processing unit, a television demodulator, and a second signal processing unit. The first signal processing unit performs a first signal processing operation upon a television signal according to a feedback signal to reduce distortion of the television signal and accordingly generate a processed television signal. The television demodulator is coupled to the first signal processing unit for receiving the processed television signal, and demodulating the processed television signal to generate a demodulated television signal. The second signal processing unit is coupled to the first signal processing unit and the television demodulator for receiving the demodulated television signal, and performing a second signal processing operation upon the received demodulated television signal to generate the feedback signal.

20 Claims, 10 Drawing Sheets

FIG. 10

TELEVISION SIGNAL PROCESSING DEVICE AND TELEVISION SIGNAL PROCESSING METHOD

BACKGROUND

The present invention relates to television signal processing, and more particularly, to a television signal processing device and a television signal processing method for reducing distortion of a television signal before demodulation by a feedback signal obtained from processing a demodulated television signal.

For an analog television, a composite video signal carries information of brightness, chrominance, and synchronization, and thus becomes a common used format. In addition, by modulating a radio frequency (RF) carrier, the composite video signal would be converted into an RF signal. Therefore, a demodulation process is required for a receiving end (e.g., a television or a set-top box) to convert the received RF signal into the corresponding composite video signal to obtain the information of brightness, chrominance, and synchronization from the composite video signal.

However, if distortion exists in the received RF signal, the received RF signal may not be converted into the original composite video signal accurately in the following demodulation process, which may further affect an image output.

SUMMARY

In accordance with an embodiment of the present invention, an exemplary television signal processing device is proposed. The television signal processing device includes a first signal processing unit, a television demodulator, and a second signal processing unit. The first signal processing unit performs a first signal processing operation upon a television signal according to a feedback signal to reduce distortion of the television signal and accordingly generates a processed television signal. The television demodulator is coupled to the first signal processing unit for receiving the processed television signal, and demodulating the processed television signal to generate a demodulated television signal. The second signal processing unit is coupled to the first signal process unit and the television demodulator for receiving the demodulated television signal, and performing a second signal processing operation upon the received demodulated television signal to generate the feedback signal.

In accordance with another embodiment of the present invention, an exemplary television signal processing method is proposed. The television signal processing method includes: performing a first signal processing operation upon a television signal according to a feedback signal to reduce distortion of the television signal, and accordingly generating a processed television signal; performing a demodulating operation upon the processed television signal to generate a demodulated television signal; and performing a second signal process upon the demodulated television signal to generate the feedback signal.

These and other objectives of the present invention will no doubt become obvious to those of ordinary skill in the art after reading the following detailed description of the preferred embodiment that is illustrated in the various figures and drawings

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The spirit of the invention is to obtain a feedback signal according to a demodulated signal (e.g., a baseband signal complying with an analog television specification), and process the input television signal (e.g., an RF signal complying with the analog television specification) according to information of the feedback signal to reduce distortion of the television signal. Technical features of the present invention are further described below by several embodiments.

Figure 1:
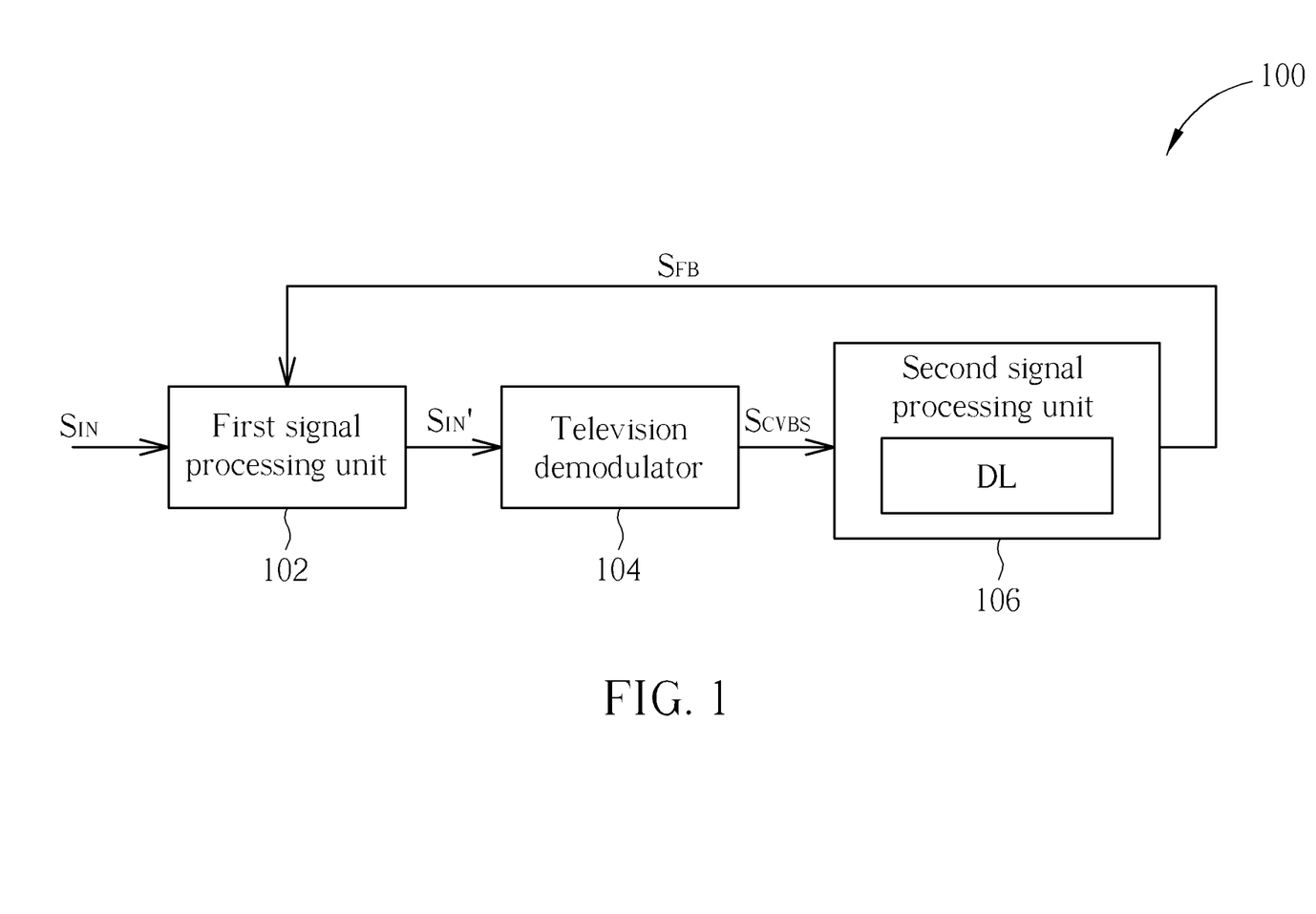
FIG. 1 is a block diagram illustrating a television signal processing device according to an embodiment of the present invention.

Please refer to FIG. 1, which is a block diagram illustrating a television signal processing device according to an embodiment of the present invention. In this embodiment, a television signal processing device 100 may be disposed in a television or a set-up box, and includes (but not limited to) a first signal processing unit 102, a television demodulator 104, and a second signal processing unit 106. The first signal processing unit 102 performs a first signal processing operation upon a television signal $S_{IN}$ (e.g., an RF signal complying with an analog television specification) according to a feedback signal $S_{FB}$ to reduce distortion of the television signal $S_{IN}$ and generates a processed television signal $S_{IN}'$. The television demodulator 104 is coupled to the first signal processing unit 102 for receiving the processed television signal $S_{IN}'$, and demodulating the processed television signal $S_{IN}'$ to generate a demodulated television signal $S_{CVBS}$ (e.g., a baseband signal complying with the analog television specification). The second signal processing unit 106 is coupled to the first signal processing unit 102 and the television demodulator 104 for receiving the demodulated television signal $S_{CVBS}$, and performing a second signal processing operation upon the received demodulated television signal $S_{CVBS}$ to generate the feedback signal $S_{FB}$ to the first signal processing unit 102.

In this embodiment, the second signal processing unit 106 generates the feedback signal $S_{FB}$ according to an amount of delay DL and the demodulated television signal $S_{CVBS}$. For instance, the second signal processing unit 106 decides the amount of delay DL according to a default time to which a default horizontal line (H-line) length corresponds and a computing time of the first signal processing operation and the demodulating operation. As the computing time of the first signal processing operation and the demodulating operation can be determined and known at the time the circuit design of the first signal processing unit 102 and the television demodulator 104 was finished, the computing time would be a constant. Accordingly, as both of the default time and the computing time are constants, the amount of delay DL which the second signal processing unit 106 uses is also a constant.

Figure 2:
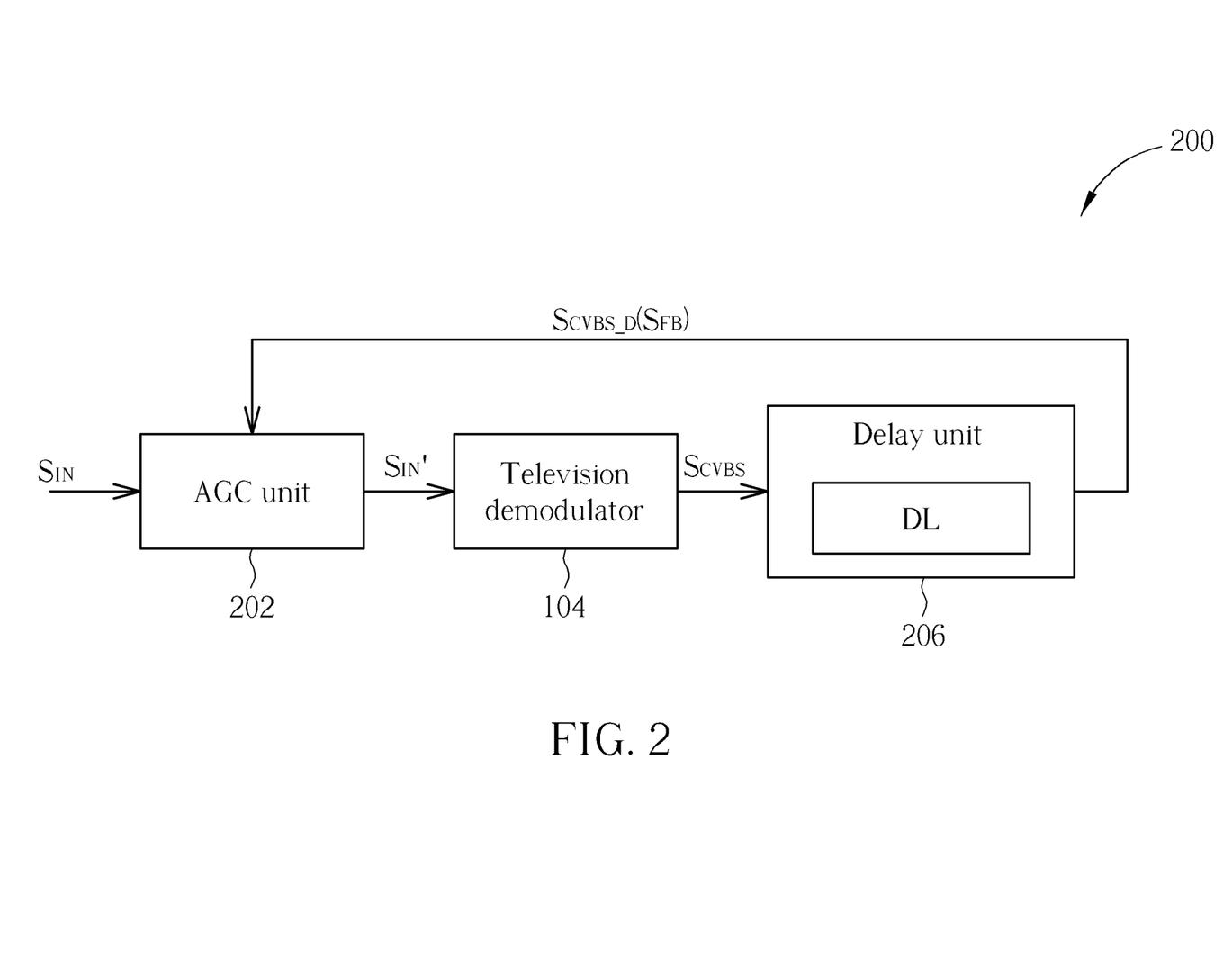
FIG. 2 is a diagram illustrating a television signal processing device in FIG. 1 according to the first embodiment of the present invention.

Please refer to FIG. 2, which is a diagram illustrating a first exemplary implementation of the television signal processing device shown in FIG. 1. In this embodiment, an automatic gain control (AGC) unit 202 and a delay unit 206 are utilized in a television signal processing device 200 to implement the first signal processing unit 102 and the second signal processing unit 106 shown in FIG. 1 respectively. The delay unit 206 delays the demodulated television signal $S_{CVBS}$ according to the amount of delay DL, and accordingly generates a delayed television signal $S_{CVBS\_D}$ to serve as the feedback signal $S_{FB}$ mentioned above, where the delayed television signal $S_{CVBS\_D}$ is utilized to indicate a position of a sync tip of each H-line in the television signal $S_{IN}$. For instance, the initial position of H-lines in the delayed television signal $S_{CVBS\_D}$ is aligned with the initial position of H-lines in the television signal $S_{IN}$, substantially. For example, the initial position corresponding to the $M^{th}$ H-line in the delayed television signal $S_{CVBS\_D}$ is substantially aligned with the initial position corresponding to the $N^{th}$ H-line in the television signal $S_{IN}$. If the amount of delay DL is set to a difference between a default time L corresponding to a default H-line length and a computing time T of the first signal processing operation and the demodulating operation (i.e., DL=L−T), there is a time interval of a single H-line between H-lines in the delayed television signal $S_{CVBS\_S}$ and H-lines in the television signal $S_{IN}$. That is, M=N−1. Thus, the initial position corresponding to the $(N-1)^{th}$ H-line in the delayed television signal $S_{CVBS\_D}$ is aligned with the initial position corresponding to the $N^{th}$ H-line in the television signal $S_{IN}$, substantially. However, this is for illustrative purpose only, and is not meant to be a limitation of the present invention. That is, in other embodiments, the amount of delay DL may be set to a different constant, which still makes the initial position corresponding to the $M^{th}$ H-line in the delayed television signal $S_{CVBS\_D}$ substantially aligned with the initial position corresponding to the $N^{th}$ H-line in the television signal $S_{IN}$ while M is not equal to N−1. For instance, M is equal to N, but H-lines indexed by M and N do not belong to the same field. For example, the initial position of the $N^{th}$ H-line corresponding to the $X^{th}$ field in the delayed television signal $S_{CVBS\_D}$ is substantially aligned with the initial position of the $N^{th}$ H-line corresponding to the $Y^{th}$ field of the television signal $S_{IN}$, where X is not equal to Y (e.g., Y=X+1).

Figure 3:
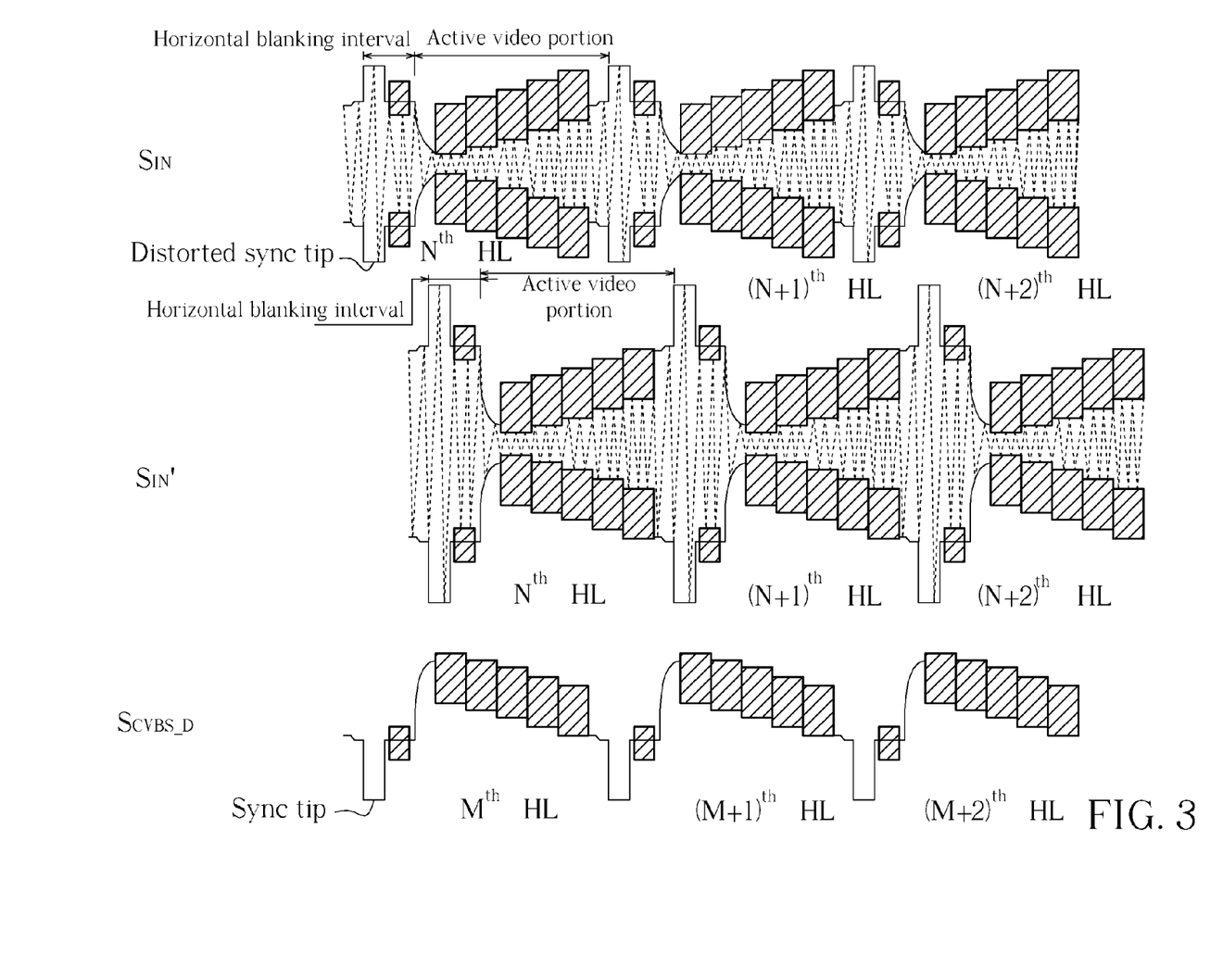
FIG. 3 is a diagram illustrating a television signal, a processed television signal, and a delayed television signal.

To summarize, as shown in FIG. 3, the television signal $S_{IN}$ includes the $N^{th}$ H-line ($N^{th}$ HL), the $(N+1)^{th}$ H-line ($(N+1)^{th}$ HL), and the $(N+2)^{th}$ H-line ($(N+2)^{th}$ HL). The delayed television signal $S_{CVBS\_D}$ includes the $M^{th}$ H-line ($M^{th}$ HL), the $(M+1)^{th}$ H-line ($(M+1)^{th}$ HL), and the $(M+2)^{th}$ H-line ($(M+2)^{th}$ HL), wherein the initial positions of $M^{th}$ HL, $(M+1)^{th}$ HL, and $(M+2)^{th}$ HL are aligned with the initial positions of $N^{th}$ HL, $(N+1)^{th}$ HL, and $(N+2)^{th}$ HL, respectively.

Further, the AGC unit 202 only applies a gain to a single signal section of an H-line in the television signal $S_{IN}$ according to the feedback signal $S_{FB}$. By way of example, each H-line is divided into a horizontal blanking interval and an active video portion, wherein information of the horizontal blanking interval is not displayed on a display screen. For example, the horizontal blanking interval includes a sync tip. If the sync tip of the horizontal blanking interval is distorted (e.g., a signal voltage level of the sync tip is lower than an original signal voltage level as expected), the AGC unit 202 is capable of obtaining the position of the sync tip of the H-line in the television signal $S_{IN}$ according to the sync tip in the delayed television signal $S_{CVBS\_D}$, detecting a voltage level of a signal section corresponding to the sync tip in the television signal $S_{IN}$, and applying a gain to the signal section corresponding to the sync tip to change the signal voltage level for reducing the distortion of the signal section corresponding to the sync tip. As shown in FIG. 3, regarding the same H-line, the AGC unit 202 changes the voltage level of the signal section corresponding to the sync tip without altering the voltage level of an active video portion. Please note that, since a computing time is needed by the AGC unit 202, there is a time interval between an output timing of the processed television signal $S_{IN}$' and an input timing of the television signal $S_{IN}$, as shown in FIG. 3.

Figure 4:
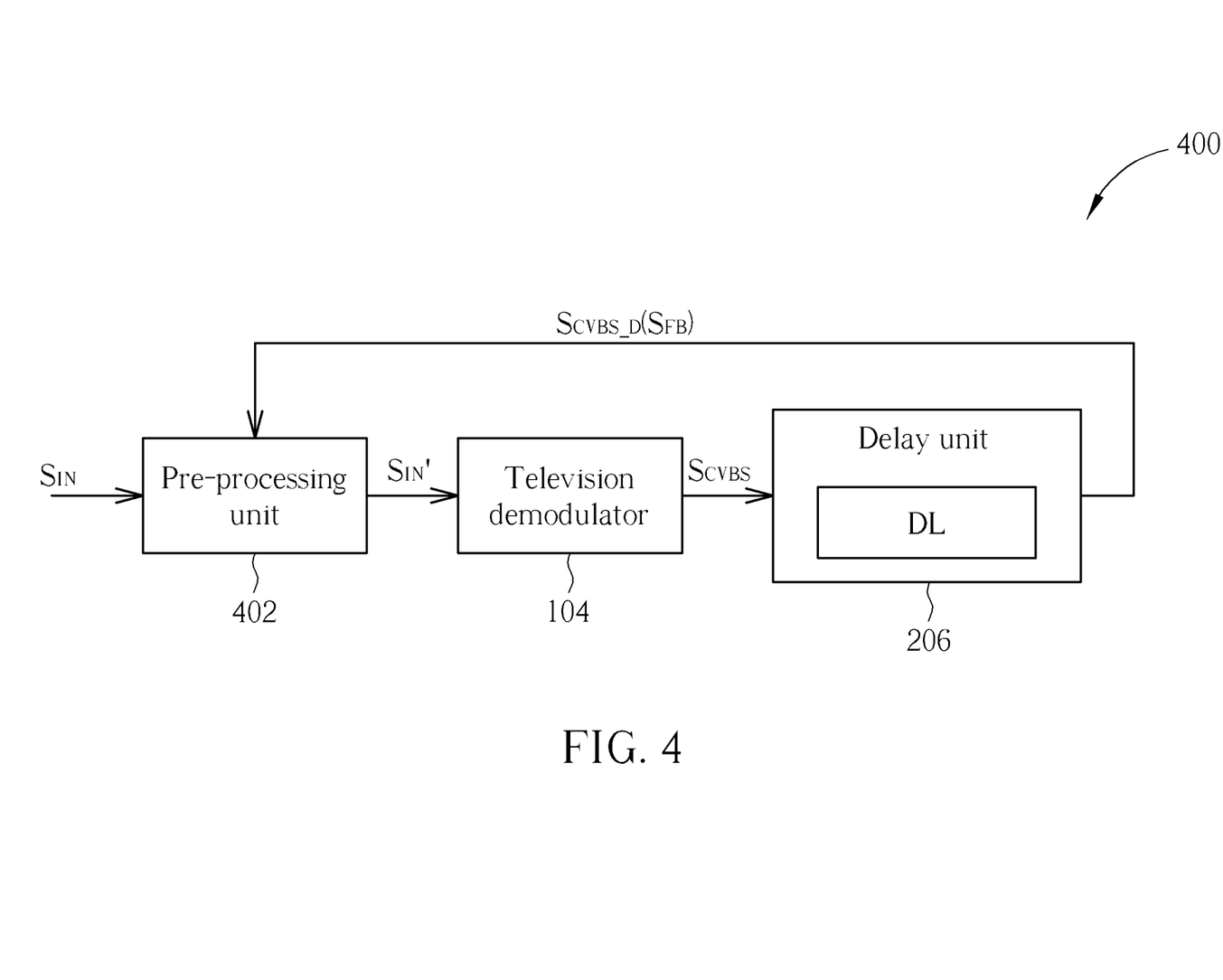
FIG. 4 is a diagram illustrating a television signal processing device in FIG. 1 according to the second embodiment of the present invention.

Please refer to FIG. 4, which is a diagram illustrating a second exemplary implementation of the television signal processing device shown in FIG. 1. In this embodiment, a pre-processing unit 402 and the aforementioned delay unit 206 are utilized in a television signal processing device 400 to implement the first signal processing unit 102 and the second signal processing unit 106 shown in FIG. 1 respectively. As the operation of the delay unit 206 has been detailed above, further description of the delay unit 206 is omitted here for brevity. As to the pre-processing unit 402, it applies different gains to different signal sections of the same H-line in the television signal $S_{IN}$ according to the feedback signal $S_{FB}$. Therefore, compared with the AGC unit 202 (which only processes a single signal section of each H-line) shown in FIG. 2, the pre-processing unit 402 has more flexibility in processing the television signal $S_{IN}$, and is capable of producing a signal output with better signal quality. By way of example, if other signal sections are also distorted besides the sync tip in the horizontal blanking interval (e.g., a signal voltage level of the sync tip is lower than an original signal voltage level as expected), the pre-processing unit 402 is capable of obtaining the position of the sync tip in the television signal $S_{IN}$ according to the sync tip in the delayed television signal $S_{CBS\_D}$. Further, except applying a gain to the signal section corresponding to the sync tip to elevate the signal voltage level for reducing the distortion of the signal section corresponding to the sync tip, the pre-processing unit 402 may also apply other gain(s) to other signal section(s) of the same H-line to adjust the signal voltage level(s) properly, thereby making the adjusted television signal $S_{IN}$' more similar to the undistorted original television signal.

In the embodiments shown in FIG. 2 and FIG. 4, the feedback signal $S_{FB}$ is generated by directly delaying the demodulated television signal $S_{CVBS}$ according to the amount of delay DL. However, this is for illustrative purpose only. In practice, any signal capable of indicating the sync tip position in the H-line of the television signal $S_{IN}$ may be utilized as the feedback signal $S_{FB}$.

Figure 5:
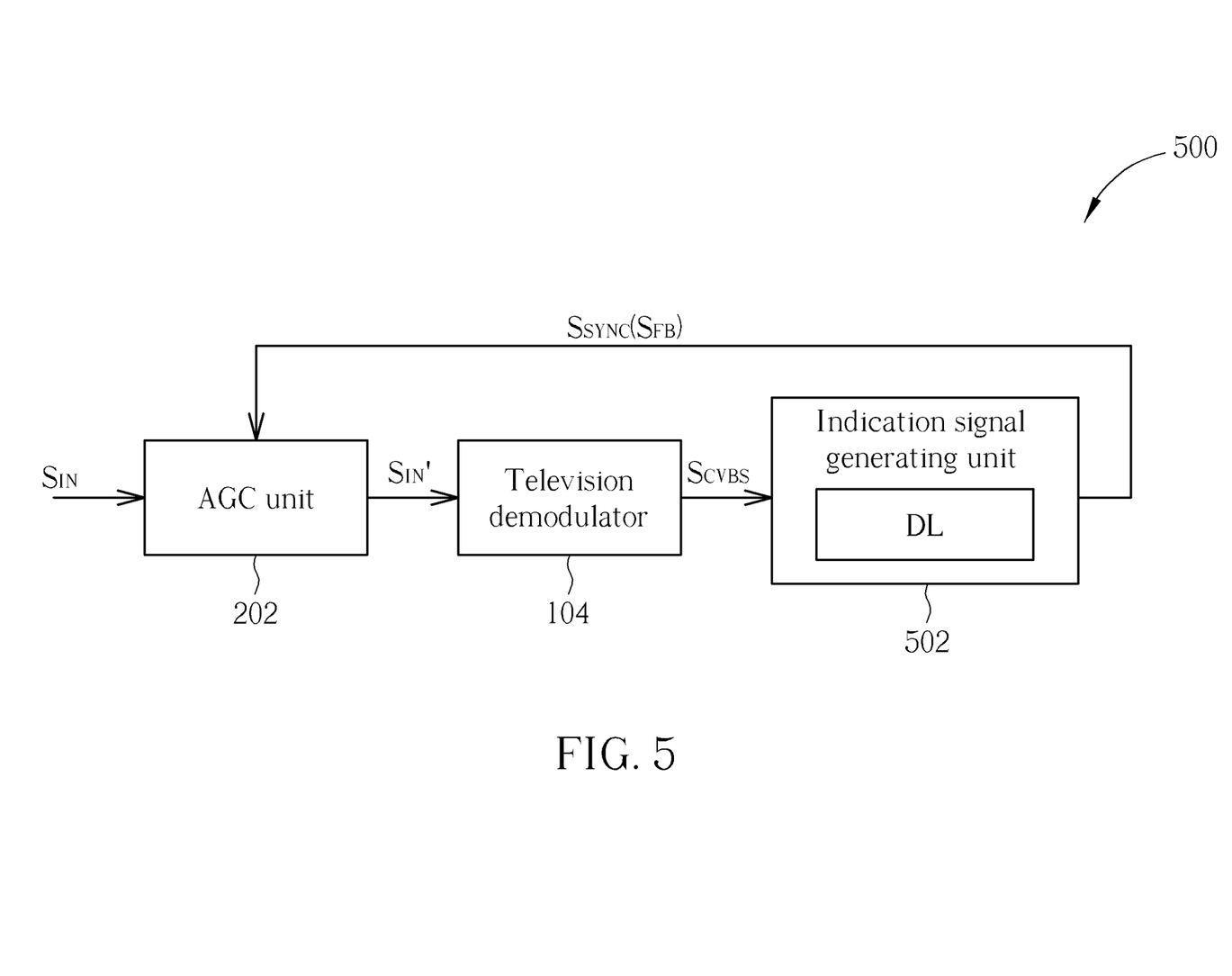
FIG. 5 is a diagram illustrating a television signal processing device in FIG. 1 according to the third embodiment of the present invention.
Figure 6:
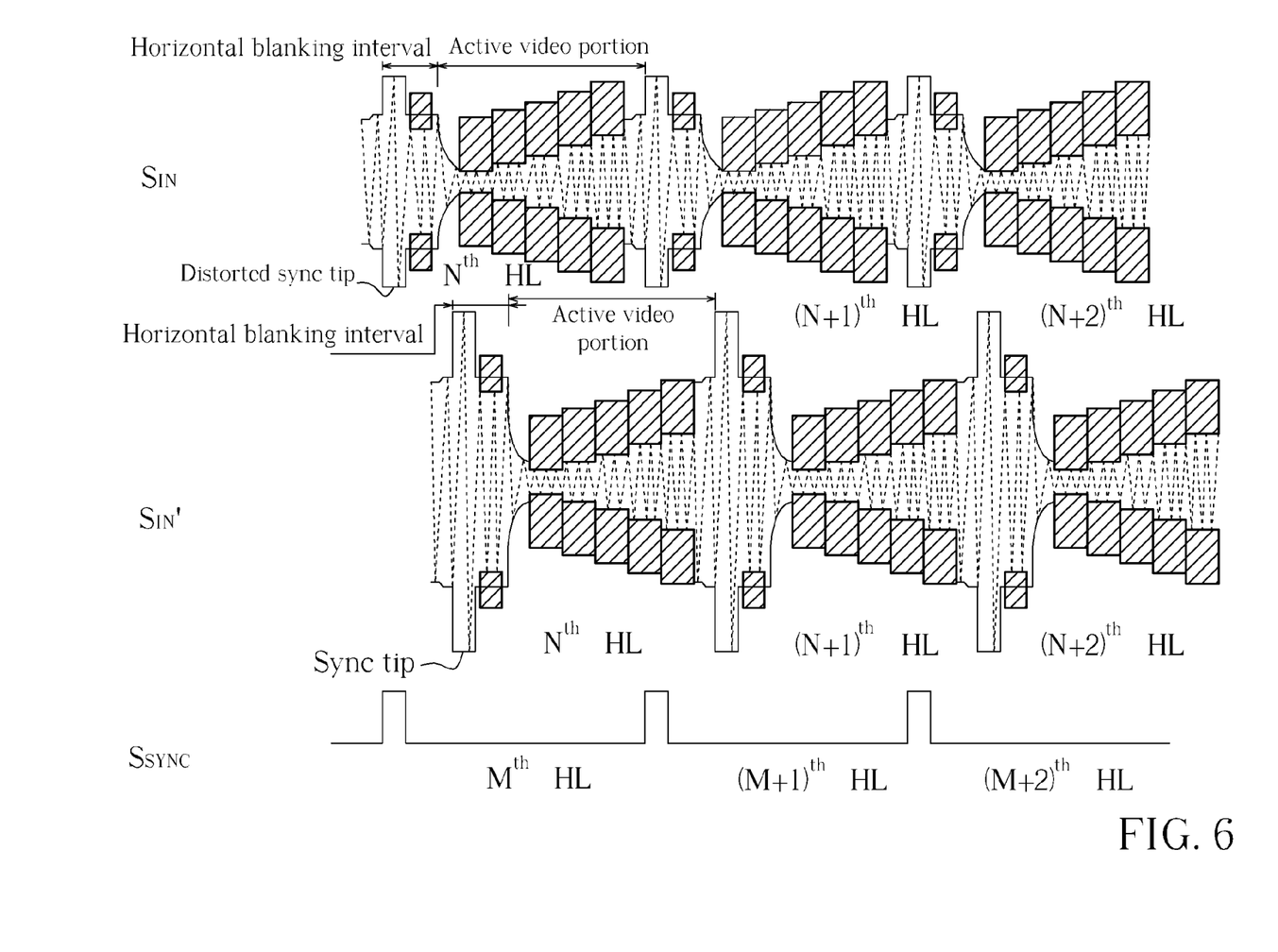
FIG. 6 is a diagram illustrating a television signal, a processed television signal, and a sync tip indication signal.

Please refer to FIG. 5, which is a diagram illustrating a third exemplary implementation of the television signal processing device shown in FIG. 1. In this embodiment, the AGC unit 202 described above and an indication signal generating unit 502 are utilized in a television signal processing device 500 to implement the first signal processing unit 102 and the second signal processing unit 106 shown in FIG. 1 respectively. As the operation of the AGC unit 202 has been detailed above, further description is omitted here for brevity. As to the indication signal generating unit 502, it generates a sync tip indication signal $S_{SYNC}$ to serve as the feedback signal $S_{FB}$ according to the sync tip of each H-line in the demodulated television signal $S_{CVBS}$ and the amount of delay DL, where the sync tip indication signal $S_{SYNC}$ is utilized to indicate a position of the sync tip of each H-line in the television signal $S_{IN}$, as shown in FIG. 6. Referring to the sync tip indication signal $S_{SYNC}$ shown in FIG. 6, it can be known that an initial position of a signal of the sync tip indicated by a specific logic value (e.g., a logic value "1") in the sync tip indication signal $S_{SYNC}$ is substantially aligned with an initial position of an H-line in the television signal $S_{IN}$. Similarly, based on different settings of the amount of delay DL, the difference between an initial position of the sync tip indicated by the sync tip indication signal $S_{SYNC}$ with a specific logic value (e.g., a logic value "1") and an initial position of an H-line in the television signal $S_{IN}$ would be a time interval of one or more H-lines. For example, M=N−1, where H-lines indexed by M and N−1 respectively belong to the same field; or M=N, where H-lines indexed by M and N do not belong to the same field. As those skilled in the art should readily understand the relationship between the $N^{th}$ th H-line ($N^{th}$ HL), the $(N+1)^{th}$ H-line ($(N+1)^{th}$ HL), and the $(N+2)^{th}$ H-line ($(N+2)^{th}$ HL) in the television signal $S_{IN}$ and the $M^{th}$ H-line ($M^{th}$ HL), the $(M+1)^{th}$ H-line ($(M+1)^{th}$ HL), and the $(M+2)^{th}$ H-line ($(M+2)^{th}$ HL) in the sync tip indication signal $S_{SYNC}$ as shown in FIG. 6 after reading above paragraphs, further detailed description is omitted here for brevity.

Figure 7:
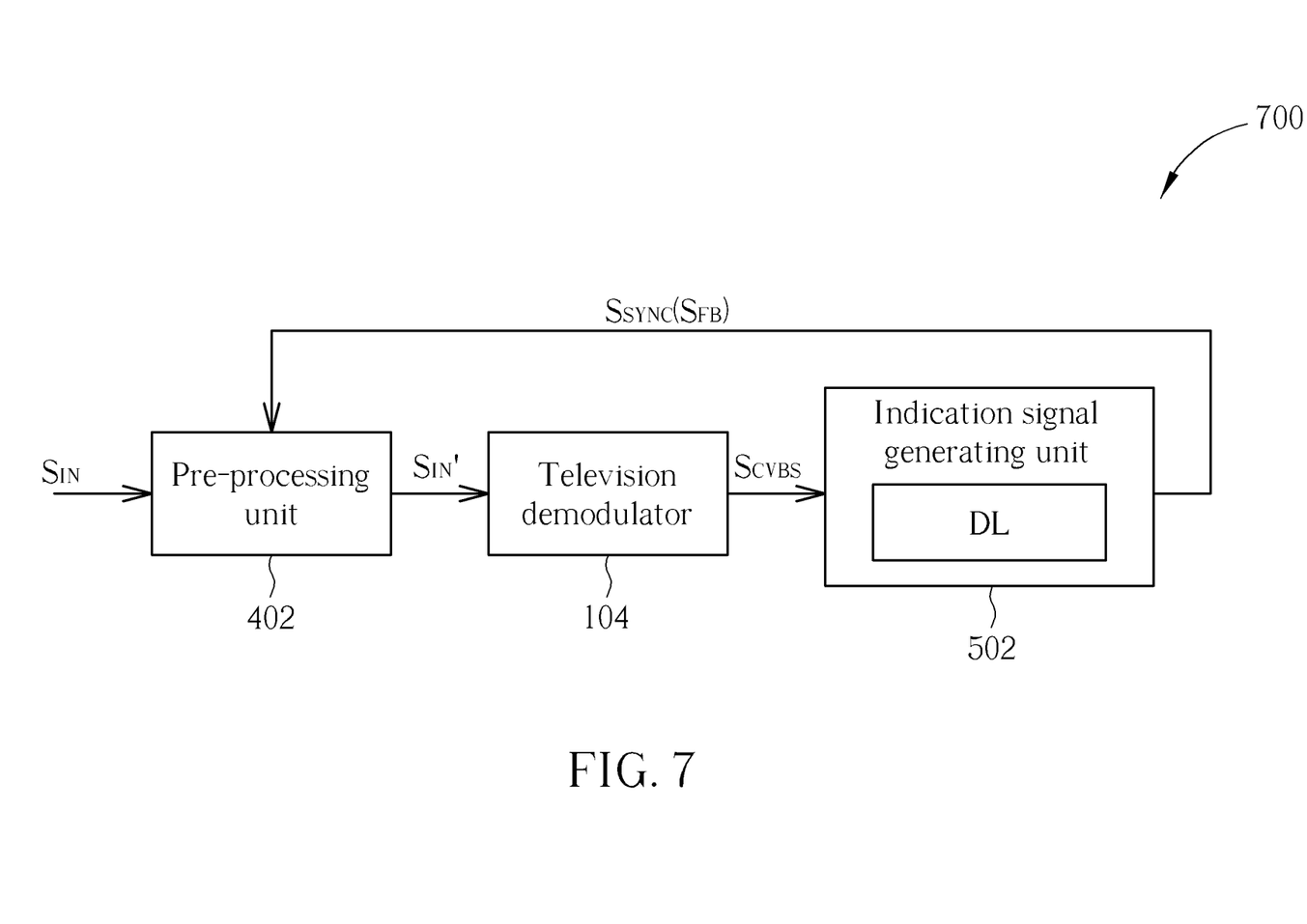
FIG. 7 is a diagram illustrating a television signal processing device in FIG. 1 according to the fourth embodiment of the present invention.

Please refer to FIG. 7, which is a diagram illustrating a fourth exemplary implementation of the television signal processing device shown in FIG. 1. In this embodiment, the aforementioned pre-processing unit 402 and indication signal generating unit 502 are utilized in a television signal processing device 700 to implement the first signal processing unit 102 and the second signal processing unit 106 shown in FIG. 1 respectively. As the operations of the pre-processing unit 402 and the indication signal generating unit 502 have been detailed above, further description is omitted here for brevity.

In above embodiments, the amount of delay DL employed by the second signal processing unit 106 (e.g., the delay unit 206 or the indication signal generating unit 502) is decided according to a default time (i.e., a constant) corresponding to a default H-line length and a computing time (i.e., a constant) of the first signal processing operation and the demodulating operation; however, each H-line length in the television signal $S_{IN}$ may not maintain consistent. In fact, the H-line length in the received television signal $S_{IN}$ may be changed due to the signal transmission process or other factor(s).

Figure 8:
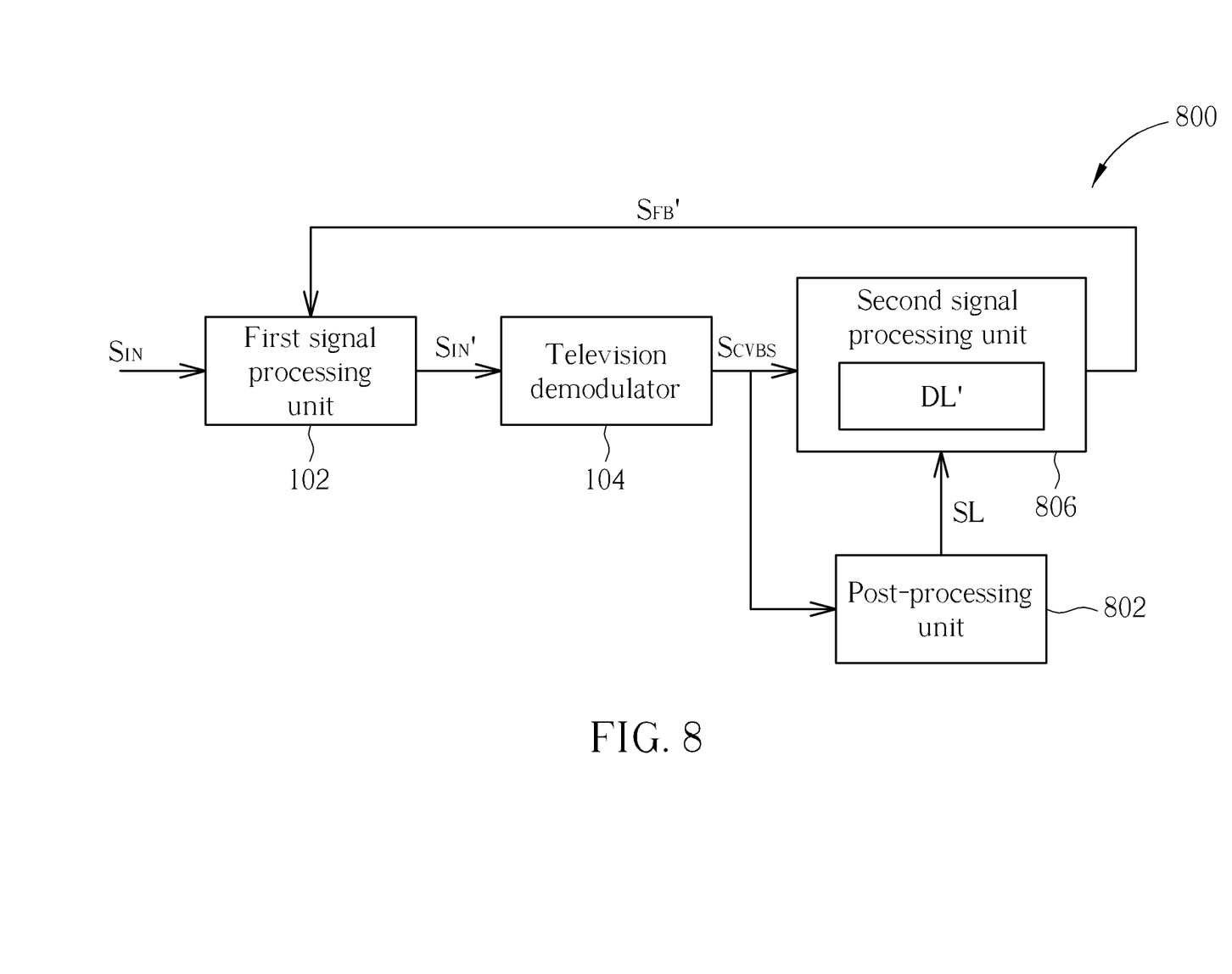
FIG. 8 is a block diagram illustrating a television signal processing device according to another embodiment of the present invention.

Please refer to FIG. 8, which is a block diagram illustrating a television signal processing device according to another embodiment of the present invention. In this embodiment, a television signal processing device 800 may be disposed in a television or a set-up box, and includes (but not limited to) the above-mentioned first signal processing unit 102, the above-mentioned television demodulator 104, a post-processing unit 802, and a second signal processing unit 806. As the operations of the first signal processing unit 102 and the television demodulator 104 have been detailed above, further description is omitted here for brevity. Compared with second signal processing unit 106 shown in FIG. 1, the second signal processing unit 806 in FIG. 8 also receives the demodulated television signal $S_{CVBS}$, and processes the received demodulated television signal $S_{CVBS}$. However, the second signal processing unit 806 decides an amount of delay DL' according to an actual time SL to which an actual H-line length provided by the post-processing unit 802 corresponds, and then delays the demodulated television signal $S_{CVBS}$ according to the amount of delay DL' to generate a feedback signal $S_{FB'}$ to the first signal processing unit 102.

In this embodiment, the post-processing unit 802 is coupled to the television demodulator 104 and the second signal processing unit 806, and arranged for estimating an actual time SL corresponding to an actual H-line length according to the demodulated television signal $S_{CVBS}$. For instance, the post-processing unit 802 calculates an average of time periods respectively corresponding to a plurality of H-lines in the demodulated television signal $S_{CVBS}$ to therefore obtain the actual time SL needed for deciding the amount of delay DL'. Next, the second signal processing unit 806 decides the amount of delay DL' according to the actual time SL corresponding to the actual horizontal line length and a computing time of the first signal processing operation and the demodulating operation. Although the computing time of the first signal processing operation and the demodulating operation can be determined and known at the time the circuit design of the first signal processing unit 102 and the television demodulator 104 was finished (i.e., the computing time is a constant), the post-processing unit 802 still estimates the actual time SL corresponding to the actual H-line length according to the demodulated television signal $S_{CVBS}$ continuously. Hence, each estimated actual time SL would not be a default constant, and the amount of delay DL' will be updated continuously in response to the variation of the actual H-line length.

To be brief, regardless of actual lengths of H-lines in the demodulated television signal $S_{CVBS}$, the second signal processing unit 106 in FIG. 1 regards each H-line as having a default H-line length and thus corresponding to the default time. However, in the embodiment shown in FIG. 8, the post-processing unit 802 estimates the actual time corresponding to the actual H-line length according to the demodulated television signal $S_{CVBS}$. Therefore, the feedback signal $S_{FB'}$ generated by the second signal processing unit 806 could indicate the position of the sync tip of each H-line in the television signal $S_{IN}$ more accurately.

Similarly, regarding the television signal processing device 800 shown in FIG. 8, the first signal processing unit 102 may be implemented using the above-mentioned AGC unit 202 or pre-processing unit 402, and the second signal processing unit 102 may be implemented using the above-mentioned delay unit 206 or indication signal generating unit 502, wherein the decision method of the amount of delay DL' is different from the decision method of the amount of delay DL.

When the television demodulator 104 is implemented using a digital circuit, the computing time consumed by the television demodulator 104 is longer due to the fact that the employed digital processing architecture is different from the analog processing architecture. However, the second signal processing unit 106/806 in the television signal processing device 100/800 would decide an amount of delay DL/DL' by considering the computing time consumed by the television demodulator 104. In this way, the feedback signal $S_{FB}/S_{FB'}$ generated by the second signal processing unit 106/806 (which may be a digital circuit) could still indicate a position of a sync tip in each H-line of the television signal $S_{IN}$ accurately. For example, in a time domain, a signal section corresponding to the sync tip in the feedback signal $S_{FB}/S_{FB'}$ is still aligned with a signal section corresponding to the sync tip in the television signal $S_{IN}$. However, this is for illustrative purpose only, and is not meant to be a limitation of the present invention. That is, no matter whether the elements in a television signal processing device are implemented using digital circuits or analog circuits, any television signal processing device employing any of the architectures shown in FIG. 1 and FIG. 8 to reduce distortion of television signals falls within the scope of the present invention.

Besides, in above embodiments, the second signal processing unit may be implemented by the delay unit or the indication signal generating unit. However, any signal processing technique capable of informing the first signal processing unit of the information needed for dealing with the television signal distortion through processing a demodulated television signal outputted by a television demodulator may be employed by the second signal processing unit, and these modifications of the design all fall within the scope of the present invention.

Figure 9:
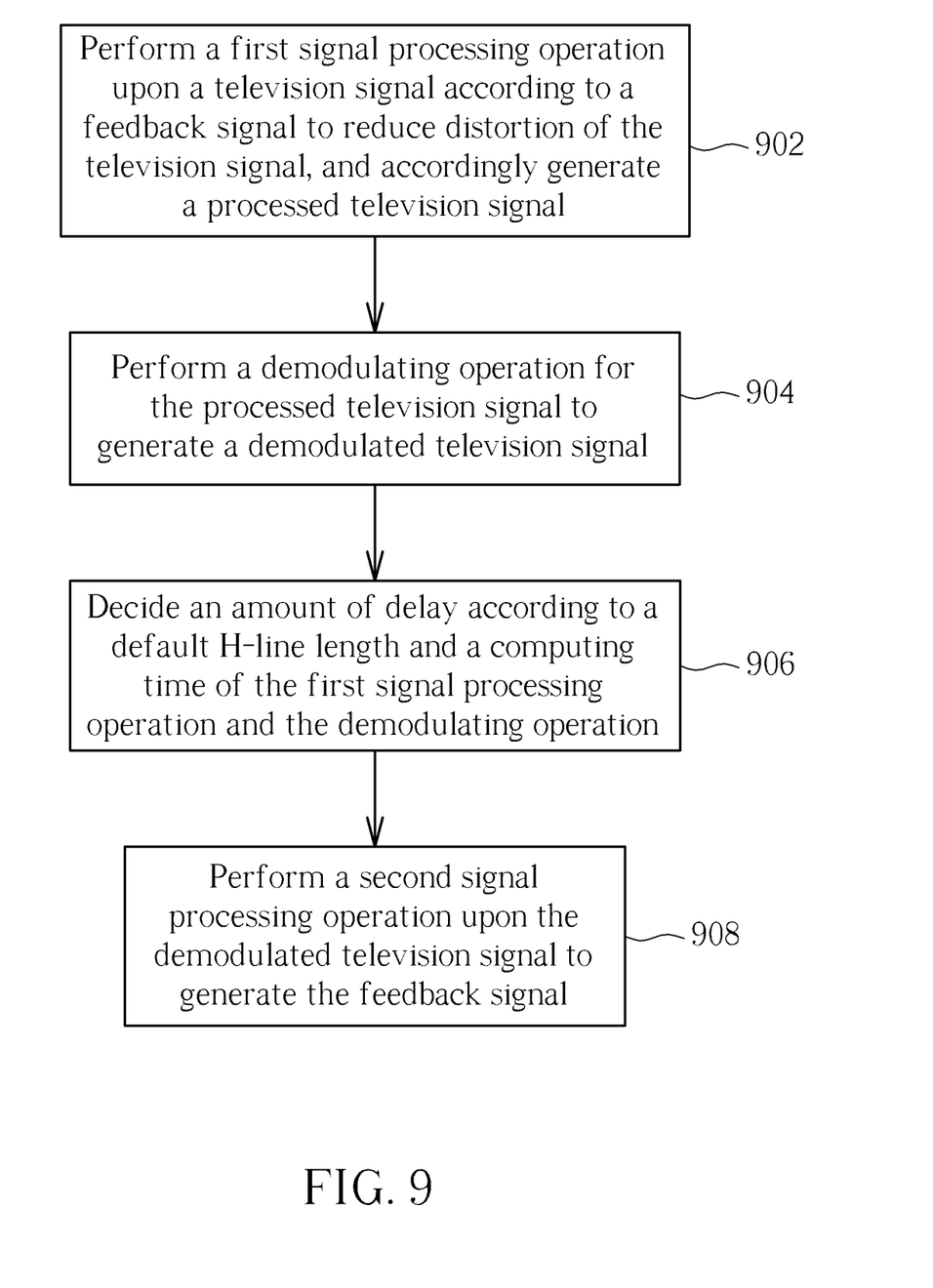
FIG. 9 is a diagram illustrating the television signal processing method according to the first embodiment of the present invention.

FIG. 9 is a flowchart illustrating a television signal processing method according to a first embodiment of the present invention. The method shown in FIG. 9 may be employed in the television signal processing device 100 shown in FIG. 1. In addition, provided that substantially the same result is achieved, the steps of the flowchart shown in FIG. 9 need not be in the exact order shown. Steps of the first embodiment of the television signal processing method are briefly summarized below:

Step 902: Perform a first signal processing operation upon a television signal according to a feedback signal to reduce distortion of the television signal, and accordingly generate a processed television signal;

Step 904: Perform a demodulating operation upon the processed television signal to generate a demodulated television signal;

Step 906: Decide an amount of delay according to a default H-line length and a computing time of the first signal processing operation and the demodulating operation; and Step 908: Perform a second signal processing operation upon the demodulated television signal to generate the feedback signal.

Figure 10:
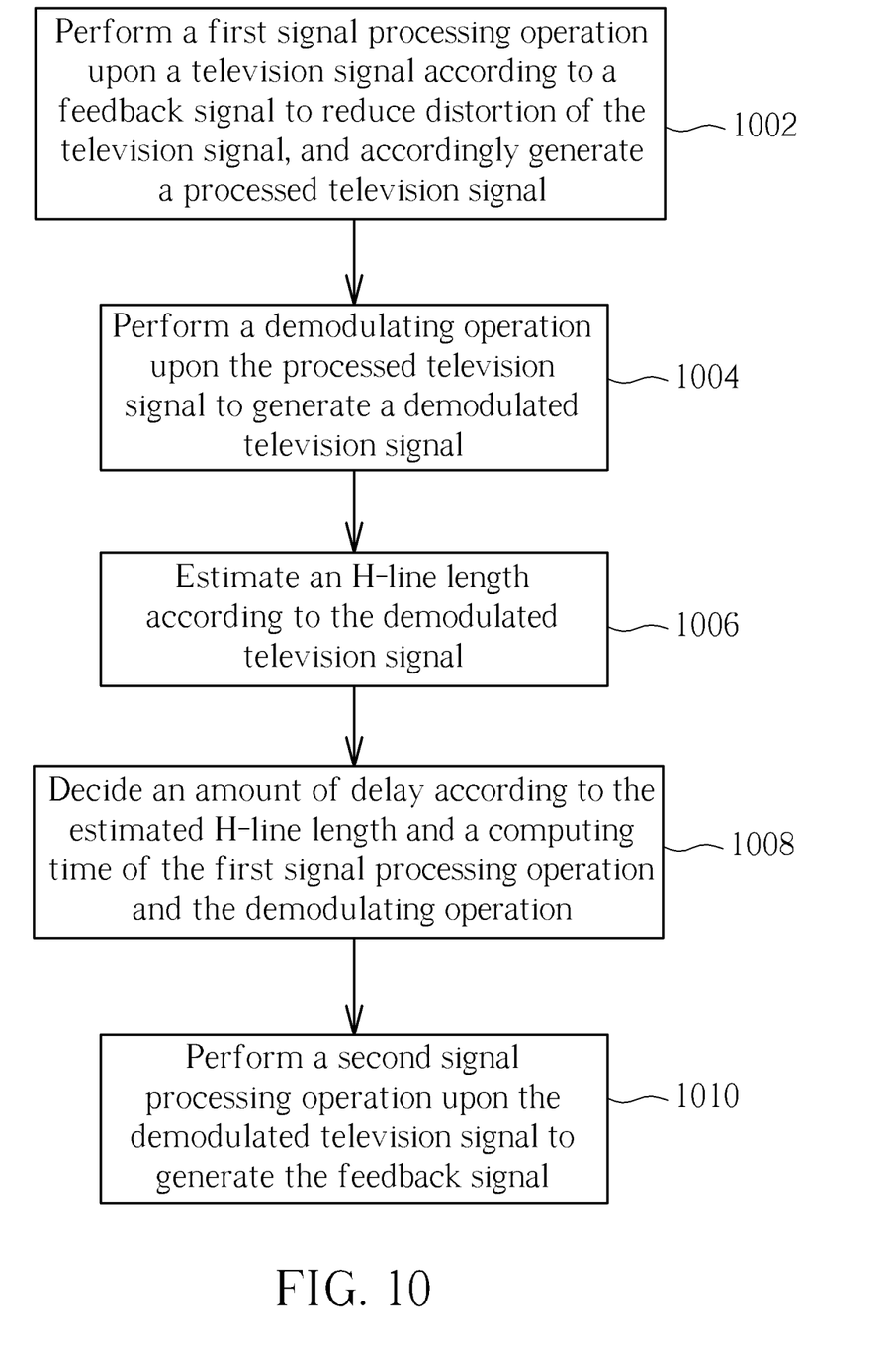
FIG. 10 is a diagram illustrating the television signal processing method according to the first embodiment of the present invention.

FIG. 10 is a flowchart illustrating the television signal processing method according to a second embodiment of the present invention. The method shown in FIG. 10 may be employed in the television signal processing device 800 shown in FIG. 8. In addition, provided that substantially the same result is achieved, the steps of the flowchart shown in FIG. 10 need not be executed in the exact order shown. Steps of the second embodiment of the television signal processing method are briefly summarized below:

Step 1002: Perform a first signal processing operation upon a television signal according to a feedback signal to reduce distortion of the television signal, and accordingly generate a processed television signal;

Step 1004: Perform a demodulating operation upon the processed television signal to generate a demodulated television signal;

Step 1006: Estimate an H-line length according to the demodulated television signal;

Step 1008: Decide an amount of delay according to the estimated H-line length and a computing time of the first signal processing operation and the demodulating operation; and Step 1010: Perform a second signal processing operation upon the demodulated television signal to generate the feedback signal.

As those skilled in the art should readily understand the operation details of the steps in FIG. 9 and FIG. 10 after reading above paragraphs directed to the television signal processing devices 100 and 800, related explanation is omitted here for brevity.

The descriptions hereinbefore are only the preferred embodiments of the present invention, equivalent modifications and alterations according to the present invention are all fall within the scope of the present invention.

What is claimed is:

1. A television signal processing devices, comprising:
a first signal processing unit, arranged for performing a first signal processing operation upon a television signal according to a feedback signal to reduce distortion of the television signal and accordingly generating a processed television signal;
a television demodulator, coupled to the first signal processing unit, the television demodulator arranged for receiving the processed television signal and performing a demodulating operation upon the processed television signal to generate demodulated television signal; and
a second signal processing unit, coupled to the first signal processing unit and the television demodulator, the second signal processing unit arranged for receiving the demodulated television signal and performing a second signal processing operation upon the received demodulated television signal to generate the feedback signal to the first signal processing unit;
wherein the feedback signal is utilized for indicating a position of a sync tip of each horizontal line in the television signal, the first signal processing operation at least comprises applying a gain to a signal section corresponding to the sync tip in the television signal to change a voltage level of the signal section.

2. The television signal processing device of claim 1, wherein the second signal processing unit generates the feedback signal according to an amount of delay and the demodulated television signal.

3. The television signal processing device of claim 2, wherein the second signal processing unit is a delay unit, and the delay unit delays the demodulated television signal by the amount of delay to generate a delayed television signal as the feedback signal.

4. The television signal processing device of claim 2, wherein the second signal processing unit is an indication signal generating unit, and the indication signal generating unit generates a sync tip indication signal as the feedback signal, according to the sync tip of each horizontal line in the demodulated television signal and the amount of delay.

5. The television signal processing device of claim 2, wherein the second signal processing unit decides the amount of delay according to a default time corresponding to a default horizontal line length and a computing time of the first signal processing operation and the demodulating operation.

6. The television signal processing device of claim 2, further comprising:
a post-processing unit, coupled to the television demodulator and the second signal processing unit, the post-processing unit arranged for estimating an actual time corresponding to an actual horizontal line length according to the demodulated television signal;

wherein the second signal processing unit decides the amount of delay according to the actual time corresponding to the actual horizontal line length and a computing time of the first signal processing operation and the demodulating operation.

7. The television signal processing device of claim 1, wherein the first signal processing unit is an automatic gain control (AGC) unit arranged for applying a gain to a single signal section of a horizontal line in the television signal according to the feedback signal.

8. The television signal processing device of claim 1, wherein the first signal processing unit is a pre-processing unit arranged for applying different gains to different signal sections of a same horizontal line, respectively, according to the feedback signal.

9. The television signal processing device of claim 1, wherein at least the television demodulator is a digital circuit.

10. The television signal processing device of claim 1, wherein the television signal complies with an analog television specification.

11. A television signal process method, comprising:

performing a first signal processing operation upon a television signal according to a feedback signal to reduce distortion of the television signal, and accordingly generating a processed television signal;

performing a demodulating operation upon the processed television signal to generate a demodulated television signal; and performing a second signal processing operation upon the demodulated television signal to generate the feedback signal;

wherein the feedback signal is utilized for indicating a position of a sync tip of each horizontal line in the television signal, the first signal processing operation at least comprises applying a gain to a signal section corresponding to the sync tip in the television signal to change a voltage level of the signal section.

12. The television signal processing method of claim 11, wherein the step of performing the second signal processing operation upon the demodulated television signal to generate the feedback signal comprises:

generating the feedback signal according to an amount of delay and the demodulated television signal.

13. The television signal processing method of claim 12, wherein the step of generating the feedback signal according to the amount of delay and the demodulated television signal comprises:

delaying the demodulated television signal by the amount of delay to generate a delayed television signal as the feedback signal.

14. The television signal processing method of claim 12, wherein the step of generating the feedback signal according to the amount of delay and the demodulated television signal comprises:

generating a sync tip indication signal as the feedback signal, according to the sync tip of each horizontal line in the demodulated television signal and the amount of delay.

15. The television signal processing method of claim 12, further comprising:

deciding the amount of delay according to a default time corresponding to a default horizontal line length and a computing time of the first signal processing operation and the demodulating operation.

16. The television signal processing method of claim 12, further comprising:

estimating an actual time corresponding to an actual horizontal line length according to the demodulated television signal; and deciding the amount of delay according to an actual time corresponding to an actual horizontal line length and a computing time of the first signal processing operation and the demodulating operation.

17. The television signal processing method of claim 11, wherein the first signal processing operation is automatic gain control (AGC) arranged for applying a gain to a single signal section of a horizontal line in the television signal according to the feedback signal.

18. The television signal processing method of claim 11, wherein the first signal processing operation is a pre-processing operation arranged for applying different gains to different signal sections of a same horizontal lines, respectively, according to the feedback signal.

19. The television signal processing method of claim 11, wherein at least the demodulating operation is performed in a digital manner.

20. The television signal processing method of claim 11, wherein the television signal complies with an analog television specification.

* * * * *